US006231996B1

(12) United States Patent
Umeno et al.

(10) Patent No.: US 6,231,996 B1
(45) Date of Patent: May 15, 2001

(54) PART OR JIG FOR GAS CARBURIZING FURNACE

(75) Inventors: Kenji Umeno, Nagasaki; Tatsuya Oishi, Kinkai-cho, both of (JP)

(73) Assignee: Shinto Kogyo Kabushiki Kaisha, Nagasaki-ken (JP)

( * ) Notice: Subject to any disclaimer, the term of this patent is extended or adjusted under 35 U.S.C. 154(b) by 0 days.

(21) Appl. No.: 08/987,876

(22) Filed: Dec. 8, 1997

(30) Foreign Application Priority Data

Dec. 9, 1996 (JP) .......................................... 8-344690

(51) Int. Cl.[7] .......................................... B32B 15/20

(52) U.S. Cl. .......................... 428/610; 428/653; 428/941

(58) Field of Search ............................ 428/610, 652, 428/653, 941; 432/253, 260, 261; 266/274

(56) References Cited

U.S. PATENT DOCUMENTS

| | | | |
|---|---|---|---|
| 3,505,104 | 4/1970 | Ingerson . | |
| 4,150,178 * | 4/1979 | Yagi et al. | 427/380 |
| 4,797,329 * | 1/1989 | Kilbane et al. | 428/623 |
| 5,049,206 * | 9/1991 | Usui et al. | 148/127 |
| 5,066,549 * | 11/1991 | Kilbane et al. | 428/653 |

FOREIGN PATENT DOCUMENTS

| | | |
|---|---|---|
| 1558510 | 3/1970 | (DE) . |
| 1956887 | 6/1970 | (DE) . |
| 55-104472 | 8/1980 | (JP) . |

* cited by examiner

*Primary Examiner*—Deborah Jones
*Assistant Examiner*—Bryant Young
(74) *Attorney, Agent, or Firm*—Wenderoth, Lind & Ponack, L.L.P.

(57) ABSTRACT

A part or jig of a metal for a gas carburizing furnace has an Al diffusion layer which has an Al content of 10 to 50 wt % in the surface portion of the part or jig, the Al diffusion layer being formed by carrying out the calorizing treatment.

3 Claims, 9 Drawing Sheets

CARBURIZING CONDITIONS : 930°C x12h x10 TIMES IN CARBURIZING GRANULATE

CARBURIZING CONDITIONS : 930°C X 12h X 10 TIMES IN CARBURIZING GRANULATE

CARBURIZING CONDITIONS : 930°C X12h X10 TIMES IN CARBURIZING GRANULATE

SCH13 NON-TREATED PRODUCT

DEPTH FROM SURFACE →

SCH13 CALORIZING-TREATED PRODUCT

DEPTH FROM SURFACE →

PART OR JIG FOR GAS CARBURIZING FURNACE

BACKGROUND OF THE INVENTION

1. Field of the Invention

The present invention relates generally to a part or jig for a gas carburizing furnace.

2. Description of the Prior Art

Carburizing treatment has been used as a surface hardening treatment for a metal, particularly as a treatment for causing carbon to penetrate and diffuse in a surface of a low carbon steel. When the quenching and tempering of a low carbon steel are carried out after carburizing, only the surface layer thereof is hardened to produce a carburized part consisting of an abrasion-resistant surface layer and a core portion having a considerable toughness. Such carburizing, quenching and tempering have been not only applied to low carbon steels, but they have been also applied to various parts and materials in various fields as a heat treatment for improving abrasion resistance.

The carburizing treatments are classified into gas, liquid and solid carburizing methods on the basis of the methods for feeding CO. Typically, the gas carburizing method has been carried out. The gas carburizing method is usually carried out in a gas carburizing furnace. The carburizing methods are also classified into a batch-type carburizing method for carrying out the carburizing every charging of a raw material, and a continuous-type carburizing method for carrying out the carburizing over a period of 24 hours. Both methods have the same principle. In addition, the gas carburizing furnaces include three types of furnaces in which only carburizing, both of carburizing and quenching, and all of carburizing, quenching and tempering are carried out, respectively. Throughout the specification, the term "gas carburizing furnace" means any one of the three types of furnaces.

FIG. 10 schematically shows an example of such gas carburizing furnaces. A material to be treated is housed in a basket or the like and fed into a portion 4, which is arranged in a furnace 3 comprising a refractory 1 and a steel shell 2, by means of a mesh belt, a hearth roll or the like. As described later, a carburizing gas is fed into the furnace. The fed carburizing gas is heated by an electric heater element 6 housed in a heater tube 5, and stirred by a fan 7, so that the gas carburizing into the material to be treated is carried out.

Thus, in a gas carburizing furnace, a gas carburizing and quenching furnace or a gas carburizing, quenching and tempering furnace, there are used various metal parts, such as a radiant tube, an electric heater tube, a furnace fan, a mesh belt, a hearth roll, a pusher, a retort, a muffle, a chain guide rail, a skid rail, a roller, a thermocouple protective tube, a heater, a gas sampling tube and a stud bolt nut. In addition, in order to introduce a treated material to be gas-carburized and quenched into the furnace, there are used various metal jigs, such as a tray, a basket, a holder, a grid, a wire gauze, a vertical rod, a crossbar and a bracing.

The aforementioned parts and jigs for the gas carburizing furnace, the gas carburizing and quenching furnace or the gas carburizing, quenching and tempering furnace, are exposed to an atmosphere of carburizing gas (RX gas) mainly containing CO, $H_2$ and $N_2$ gases at a high temperature of 800 to 1,000° C. for a long time, and used in a very severe environment wherein heating and quenching are frequently carried out. Therefore, the aforementioned parts and jigs are generally made of austenitic stainless steels or heat-resistant cast steels, which have a superior strength at elevated temperatures, a superior carburization resistance and a superior oxidation resistance at elevated temperatures. However, even if such materials are used, cracking, deformation and decreased thickness are easily caused as described below. As a result, there are problems in that the maintenance costs are increased due to their short life and the production efficiency is lowered due to facility troubles. In order to eliminate such problems, no effective measures have been taken.

(1) Cracking

As the progress of carburizing, a hard, brittle carburized layer is deeply formed in a part or jig. As a result, the thermal expansion and contraction stress caused by heating and quenching easily produce cracks, and then, cause ruptures, so that the part or jig can not be used. Many parts or jigs for a furnace have welded constructions. In the case of a welded structure, a rupture is easily caused particularly from a heat-affected zone (HAZ) of a weld, and the rupture further promotes the deformation, so that various troubles are caused.

(2) Deformation (a) When the carburizing progresses, chromium carbide or cementite is formed in a deep carburized layer in whole, to cause a considerable deformation due to volume expansion.

(b) Since the parts and jigs for the furnace have an internal stress due to welding, plastic working or the like when it is manufactured, the parts and jigs are easily deformed due to the heat produced when they are used.

(c) The jigs are deformed in the furnace by the loads of the products loaded thereon and/or the loads of the stacked jigs.

(d) The parts and jigs for the furnace are deformed by the thermal expansion and contraction stress caused by heating and quenching. When the deformation progresses, (i) the setting of products on the jigs, the assembly of the jigs and the conveyance are not smoothly carried out, so that the working efficiency is lowered. When the deformation further progresses so that the jigs can not be used, (ii) if it is tried to rectify the deformation, there is a problem in that the jigs are ruptured since the carburizing causes the jigs to be brittle.

(3) Decreased Thickness (a) In the case of an electric heater tube or a radiant tube, it has a short life since the thickness on the side of the inside face is decreased by oxidation and the embrittlement occurs on the outside face due to carburization. In particular, since the inside face is exposed to an oxidizing atmosphere at a temperature of higher than 1,000° C., the thickness is quickly decreased by oxidation to shorten the life, and the oxidized scale is removed to accumulate in the tube. Therefore, in the case of an electric heater tube, the heater and the tube are conducted to each other via the scale to cause a burning trouble, and in the case of a radiant tube, the flow of a combustion gas is deteriorated to cause a localized heating due to abnormal combustion to cause a tube burst trouble. In addition, in order to prevent such troubles, the facility must be frequently stopped to remove the scale in the tube, so that the productivity is lowered and the maintenance costs are increased.

(b) After carburizing, quenching and tempering, the shot blasting is sometimes carried out while the product is set on the jig. In such a process, the jig is easily worn and deformed so as to decrease the life.

In view of the aforementioned problems, the inventors have found that there is a possibility of greatly extending the life by: (1) suppressing the carburization and oxidation; (2)

decreasing or removing heat-affected zones of weld; (3) removing the internal stress of the part or jig for the furnace before it is used; (4) improving the abrasion resistance; and (5) improving the strength at elevated temperatures. As heat resisting alloys having a superior carburization resistance and a superior oxidation resistance, many materials are disclosed in, e.g., Japanese Patent Laid-Open Publications Nos. 7-166290 and 2-259037. However, these materials contain only a small amount (not more than 3 wt %) of Al, which is an element that is the most effective for the improvement of carburization resistance and oxidation resistance. If the material contains a great amount of Al, although the carburization resistance and oxidation resistance can be improved, the material becomes brittle. Therefore, there are problems in that it is difficult to carry out the plastic working and the material is easily cracked when it is used. In addition, the molten metal is difficult to flow when the material is cast. Moreover, there is also a problem in that it is impossible to weld the matter. Therefore, it is not possible to add a great amount of Al as a component. On the other hand, there is a method for improving the carburization resistance and oxidation resistance by performing the surface treatment of an austenitic stainless steel or a heat-resistant cast steel to form a protective film on only the surface. However, protective films formed by general surface treatments, e.g., plating, thermal spraying, vapor deposition, are immediately peeled off in a severe thermal shock environment such as a gas carburizing furnace, so that the extension of the life can not be expected.

SUMMARY OF THE INVENTION

It is therefore an object of the present invention to eliminate the aforementioned problems and to provide a part or jig which is stable for a long time when it is used for a gas carburizing furnace exposed to a severe thermal shock environment.

In order to accomplish the aforementioned and other objects, the inventors have diligently studied and turned their attention to the calorizing treatment which has been known as a corrosion resisting treatment at elevated temperatures. The Al diffusion treatment called calorizing treatment has the following characteristics.

(1) The treated object has a superior carburization resistance and a superior oxidation resistance.

(2) In an oxidizing atmosphere, the $Al_2O_3$ protective film formed on the surface of the treated object is very stable and difficult to be peeled off.

(3) The surface hardness of the treated object is several times as large as that of a matrix, so that the treated object has a superior abrasion resistance.

(4) Since an Al diffusion layer is formed by alloying a main component of the matrix with Al diffused from the surface of an object to be treated, the treated object has a strong thermal shock resistance and difficult to be peeled off.

(5) Since an object to be treated is heated to a high temperature and gradually cooled in the calorizing treatment, the heat-affected zone (HAZ) of weld disappears to cause the weld bead and the matrix to form a uniform composition, and the object to be treated is sequentially coated with the Al diffusion layer, so that the weld portion is not deteriorated.

(6) Since most of the internal stress of an object to be treated is removed in the calorizing treatment, the treated object is difficult to be deformed when it is used.

The inventors have found that, if the calorizing treatment having the aforementioned characteristics is applied to only the surface of a part or jig for a gas carburizing furnace to form therein an Al diffusion layer of a high Al content which is difficult to be peeled off, it is possible to improve the carburization resistance, oxidation resistance and abrasion resistance of the part or jig without impairing the mechanical properties and weldability to greatly extend the life of the part or jig, and made the present invention.

Therefore, the present invention relates to a part or jig of a metal for a gas carburizing furnace, a gas carburizing and quenching furnace, or a gas carburizing, quenching and tempering furnace, wherein a stabilized Al diffusion layer, which is difficult to be peeled off, is formed in the surface portion of the part or jig, the Al diffusion layer having an Al content of 10 to 50 wt % in the surface portion.

As mentioned above, an Al diffusion layer having an Al content of 10 to 50% is formed in the surface portion. The reasons why the Al content is limited to the range of from 10 to 50 wt % are as follows. In a case where the Al content is not more than 10 wt %, the thickness is increased and the Al content is decreased as Al is gradually diffused inside when a part or jig is used for a furnace. Therefore, the performance of the part or jig is rapidly deteriorated, so that it is not possible to obtain a sufficient durability. On the other hand, in a case where the Al content exceeds 50 wt %, although there is no problem in view of the foregoing, the part or jig is too hard and brittle to be practical since cracking and peeling occur easily. The hardness of the surface portion of the Al diffusion layer is preferably in the range of from 350 to 1,000 mHv, and the thickness of the Al diffusion layer is preferably in the range of from 50 to 700 $\mu$m. It is possible to adjust the Al content, thickness and hardness of the Al diffusion layer by changing the calorizing treatment temperature, the treatment time and the Al content in a calorizing powder.

A part or jig for a gas carburizing furnace is generally made of an austenitic stainless steel and a heat-resistant cast steel. However, it may be made of metal materials, such as ferritic and martensitic stainless steels, low, medium and high carbon steels and superalloys based on nickel or iron. These metal materials are suitably applied to the present invention.

The calorizing treatment is usually carried out by: preparing a calorizing powder, which is a mixture of a 5 to 95 wt % iron-aluminum alloy powder having an aluminum content of 10 to 60 wt % or aluminum powder, a 5 to 95 wt % alumina powder and a 0.1 to 2 wt % ammonium chloride powder serving as an accelerating agent; filling the calorizing powder and an object to be treated, in a semi-closed retort; and heating the retort in a heating furnace at a temperature of 600 to 1,100° C. for 5 to 20 hours while maintaining the interior of the retort in an atmosphere of an inert gas, such as argon or nitrogen or in an atmosphere of a reducing gas such as hydrogen.

The part or jig thus calorizing-treated has an improved carburization resistance, and it is hardly carburized and stable if it is used for a gas carburizing furnace exposed to a severe environment, so that it is possible to remarkably extend the life of the part or jig.

DESCRIPTION OF THE PREFERRED EMBODIMENTS

Referring now to the following Examples and Comparative Examples, the present invention will be described below in detail.

Example 1

Samples (30 mm×30 mm×3 mm) of austenitic stainless steels of Japanese Industrial Standard SUS304, SUS309 and SUS310S and heat-resistant cast steels of Japanese Industrial Standard SCH31 and SCH21, which are typically used as materials of parts or jigs for a gas carburizing furnace, a gas carburizing and quenching furnace or a gas carburizing, quenching and tempering furnace, were prepared. In addition, a calorizing powder was prepared by mixing a 60wt % iron-aluminum alloy powder having an aluminum content of 45 wt %, a 39.5 wt % alumina powder and a 0.5 wt % ammonium chloride powder. Then, each of the samples, together with the calorizing powder, was filled in a steel casing. Then, the steel casing was put in an electric furnace to be heated therein at a temperature of 950° C. for 10 hours to carry out the calorizing treatment. The chemical compositions of the used samples are shown in Table 1, and the results of the calorizing treatment are shown in Table 2.

TABLE 1

Chemical Compositions of Samples

| Materials | Composition (wt %) C | Si | Mn | P | S | Ni | Cr | Mo | N |
|---|---|---|---|---|---|---|---|---|---|
| SUS304 | up to 0.08 | up to 1.00 | up to 2.00 | up to 0.045 | up to 0.030 | 8.00–10.50 | 18.00–20.00 | — | — |
| SUS309 | up to 0.08 | up to 1.00 | up to 2.00 | up to 0.045 | up to 0.030 | 12.00–15.00 | 22.00–24.00 | — | — |
| SUS310S | up to 0.08 | up to 1.50 | up to 2.00 | up to 0.045 | up to 0.030 | 19.00–22.00 | 24.00–26.00 | — | — |
| SCH13 | 0.20–0.50 | up to 2.00 | up to 2.00 | up to 0.04 | up to 0.04 | 11.00–14.00 | 24.00–28.00 | up to 0.50 | up to 0.20 |
| SCH21 | 0.25–0.35 | Up to 1.75 | Up to 1.50 | up to 0.04 | up to 0.04 | 19.00–22.00 | 23.00–27.00 | — | — |

TABLE 2

Results of Calorizing Treatment

| Materials | Thickness of Al Diffusion Layer (μm) | Al Content of Surface Portion (wt %) | Hardness of Surface Portion (mHv) | Hardness of Matrix (mHv) |
|---|---|---|---|---|
| SUS304 | 250 | 32 | 540 | 145 |
| SUS309 | 210 | 33 | 585 | 150 |
| SUS310S | 150 | 35 | 685 | 158 |
| SCH13 | 195 | 33 | 565 | 192 |
| SCH21 | 145 | 34 | 655 | 202 |

Comparative Example 1

(Example of Carburization Resistance Test)

Figure 1:
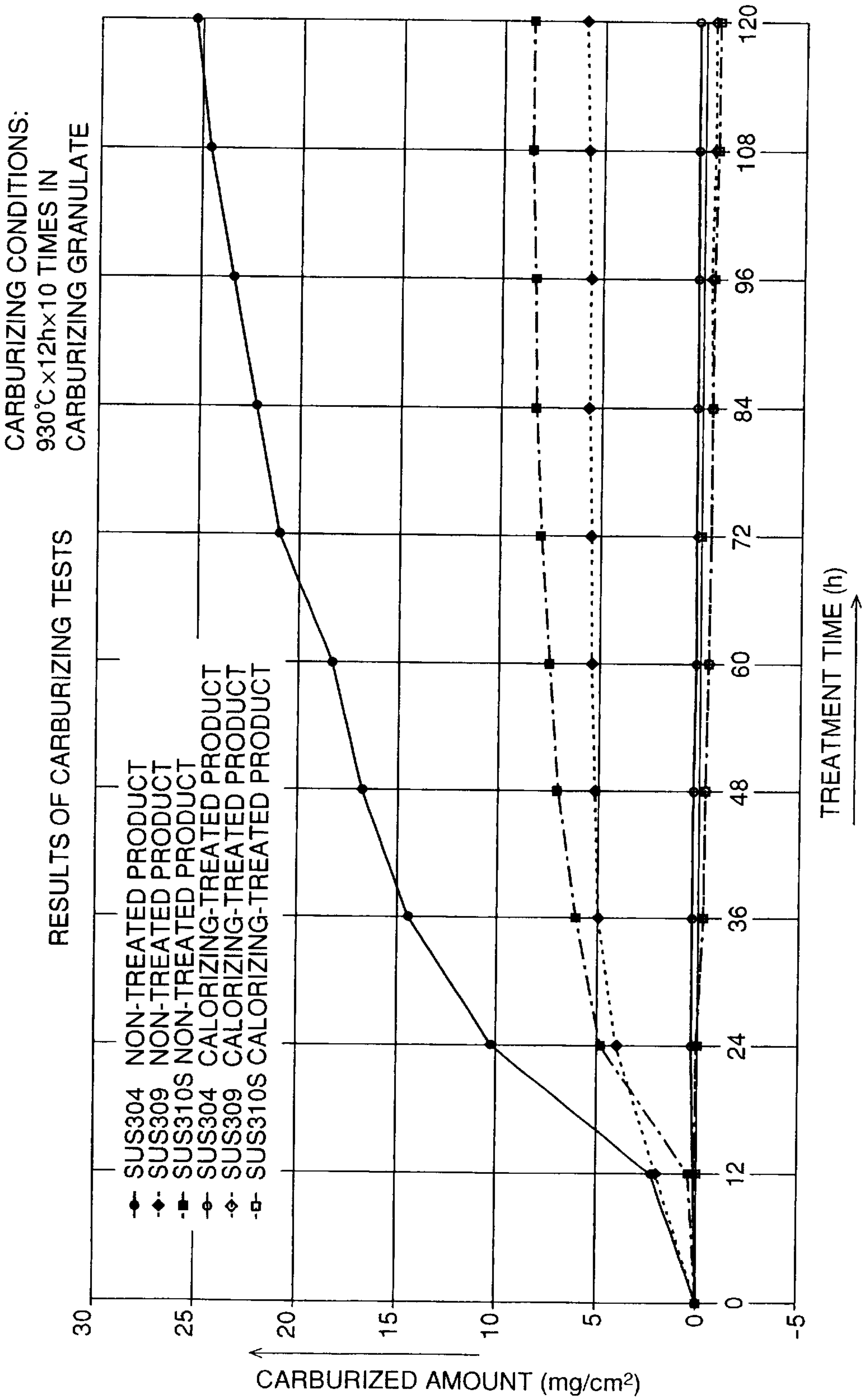
FIG. 1 is a graph showing the measurement results of the carburized amounts of some of samples obtained in Example 1, after the carburizing test is carried out.
Figure 2:
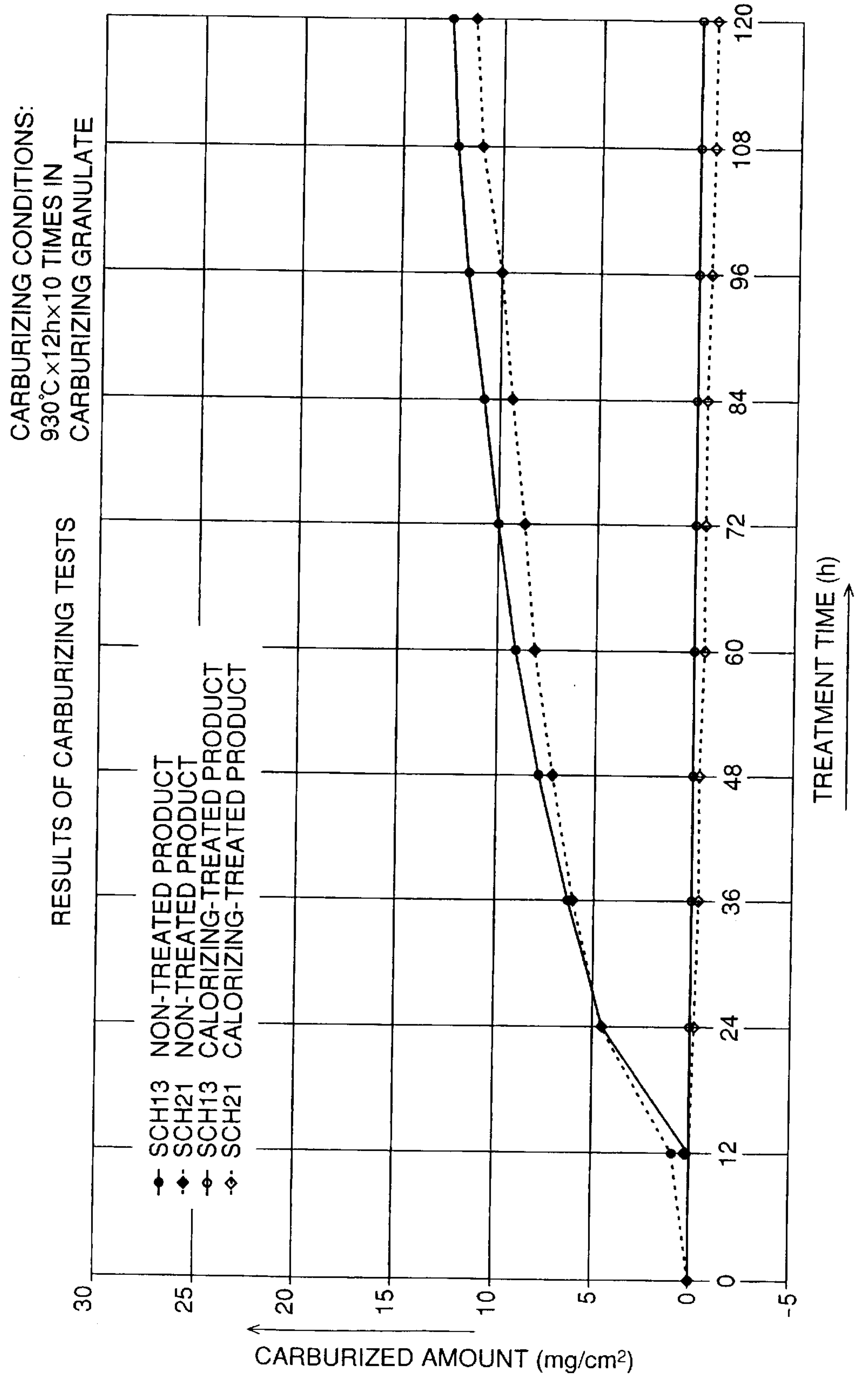
FIG. 2 is a graph showing the measurement results of the carburized amounts of other samples obtained in Example 1, after the carburizing test is carried out.
Figure 3A:
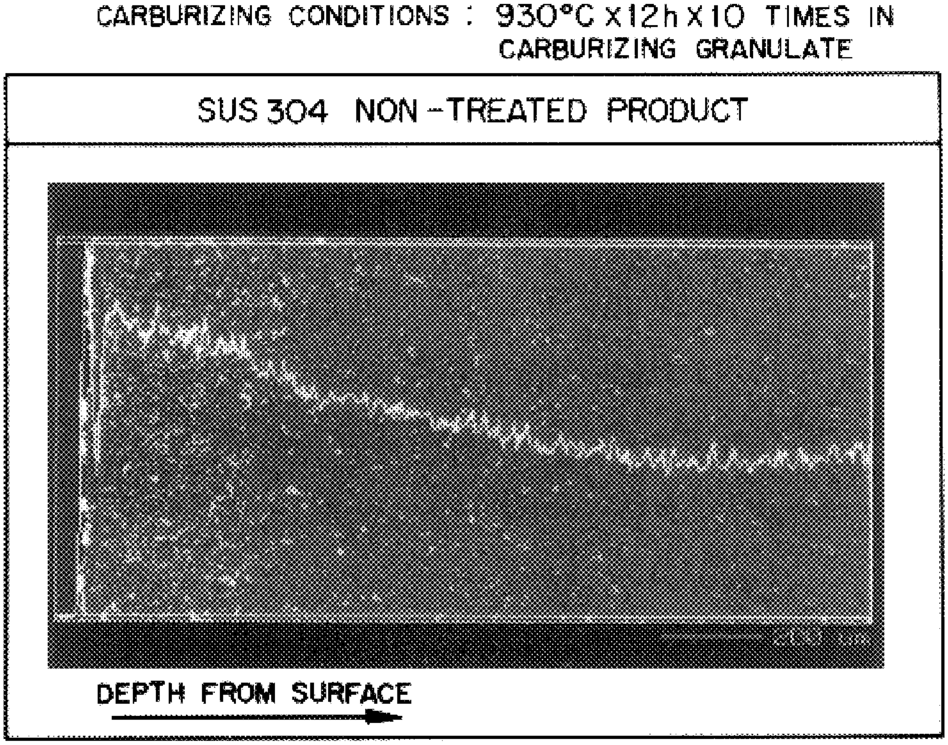
FIGS. 3(*a*) and 3(*b*) are X-ray photographs showing the C distributions on cross sections of (a) a non-treated SUS304 sample and (b) a calorizing-treated SUS304 sample, out of the samples of FIG. 1.
Figure 3B:
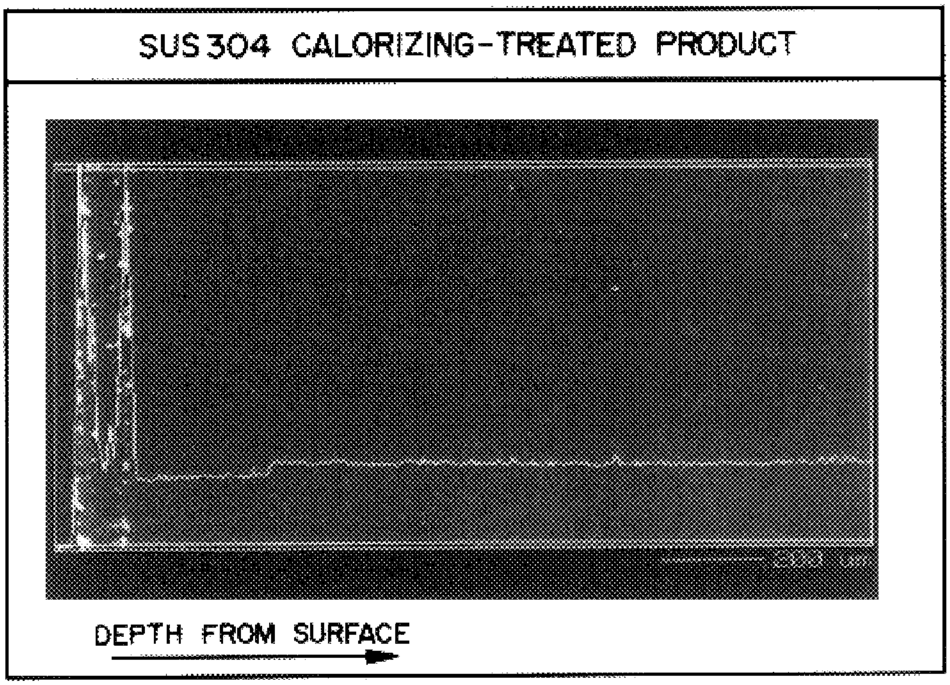
Figure 4A:
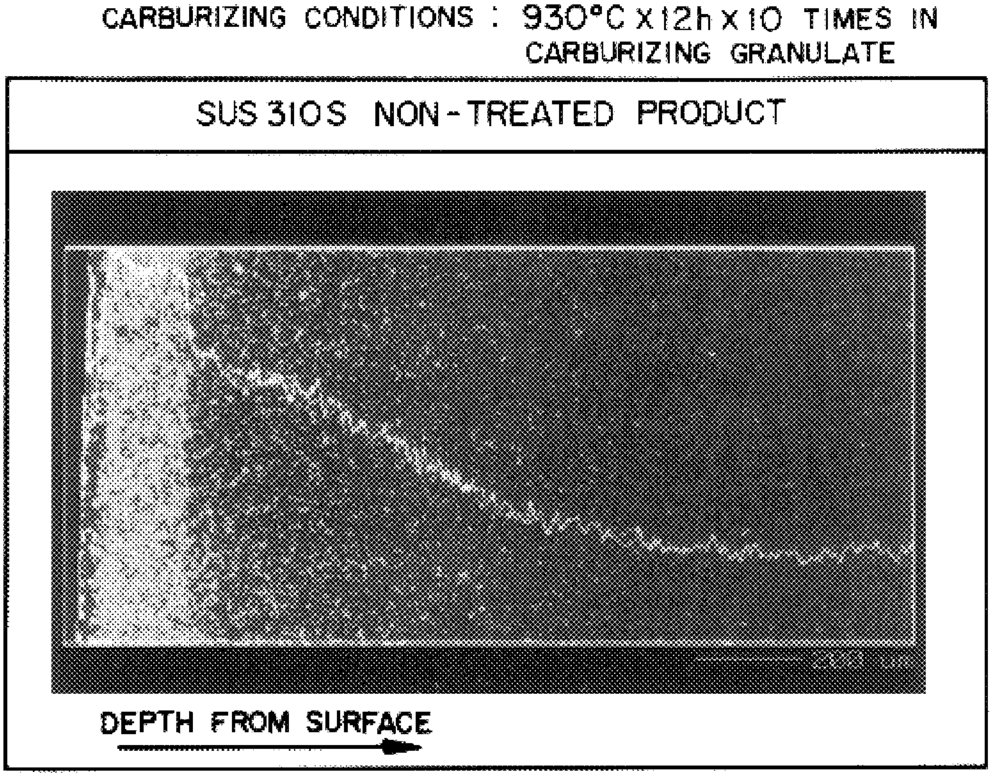
FIGS. 4(*a*) and 4(*b*) are X-ray photographs showing the C distributions on cross sections of (a) a non-treated SUS310S sample and (b) a calorizing-treated SUS310S sample, out of the samples of FIG. 1.
Figure 4B:
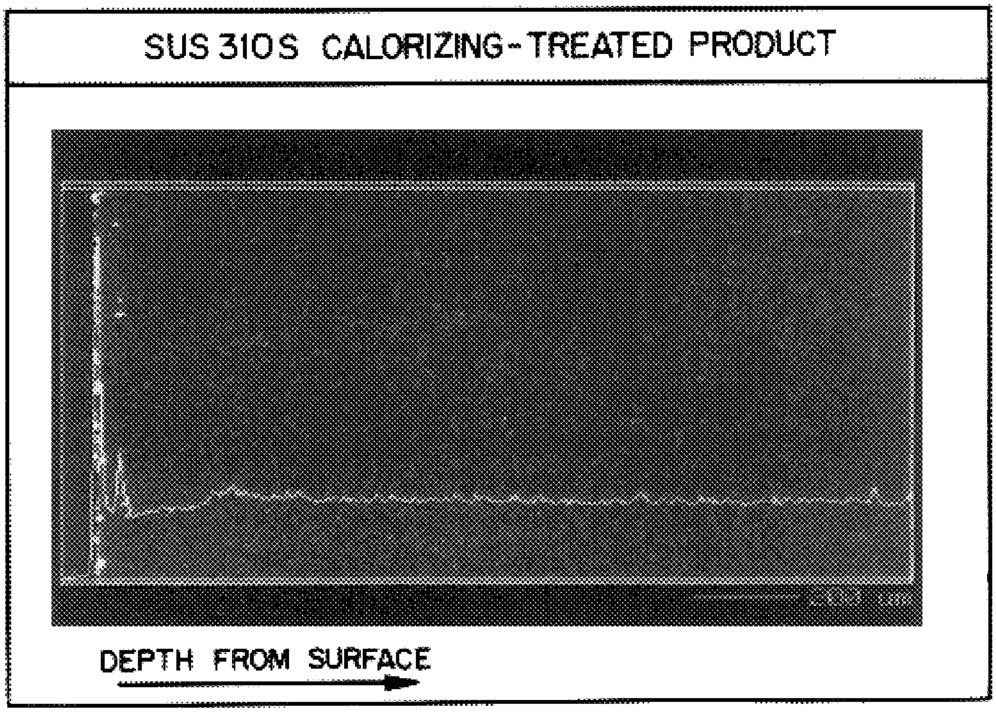
Figure 5A:
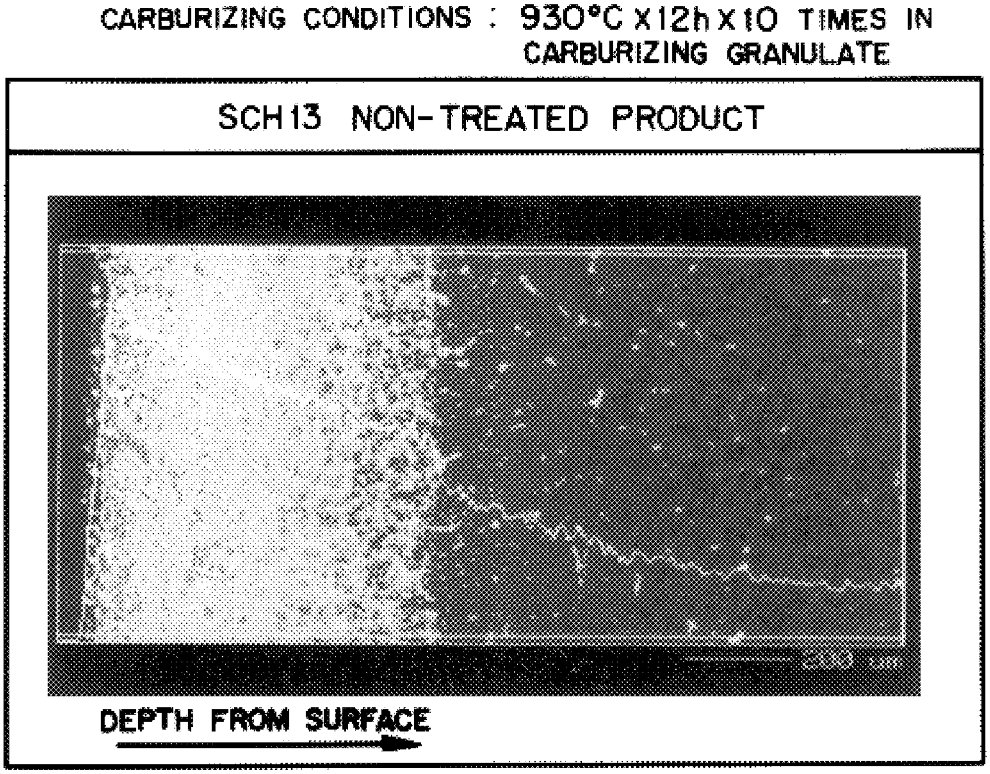
FIGS. 5(*a*) and 5(*b*) are X-ray photographs of the C distributions on cross sections of (a) a non-treated SCH13 sample and (b) a calorizing-treated SCH13 sample, out of the samples of FIG. 2.
Figure 5B:
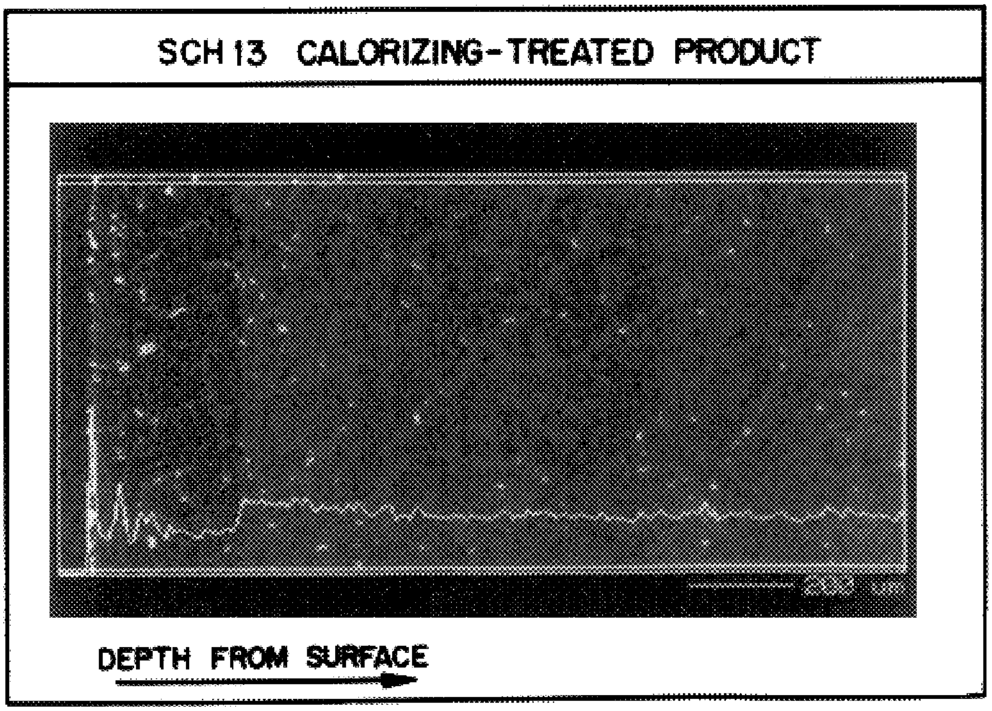

Each of the calorizing-treated samples obtained in Example 1 and non-treated samples of the same materials as those of the calorizing-treated samples, together with a carburizing granulate (Durferrit carburizing granulate), was filled in a steel casing. Then, the carburizing treatment was carried out by heating the steel casing in an electric furnace at a temperature of 930° C. for 12 hours. Such a carburizing treatment was repeated ten times. Thereafter, the carburized amount was measured, and the X-ray photographs of the C distributions were taken. The results of measurements of the carburized amounts are shown in FIGS. 1 and 2, and the X-ray photographs of the C distributions on cross sections of SUS304, SUS310S and SCH13, which were selected from the five materials, are shown in FIGS. 3, 4 and 5, respectively.

It was found from these data that the calorizing-treated samples were hardly carburized although the non-treated samples were deeply and greatly carburized, so that it was validated that the calorizing-treated samples have a superior carburization resistance.

Comparative Example 2

(Example of Oxidation Resistance Test)

Figure 6:
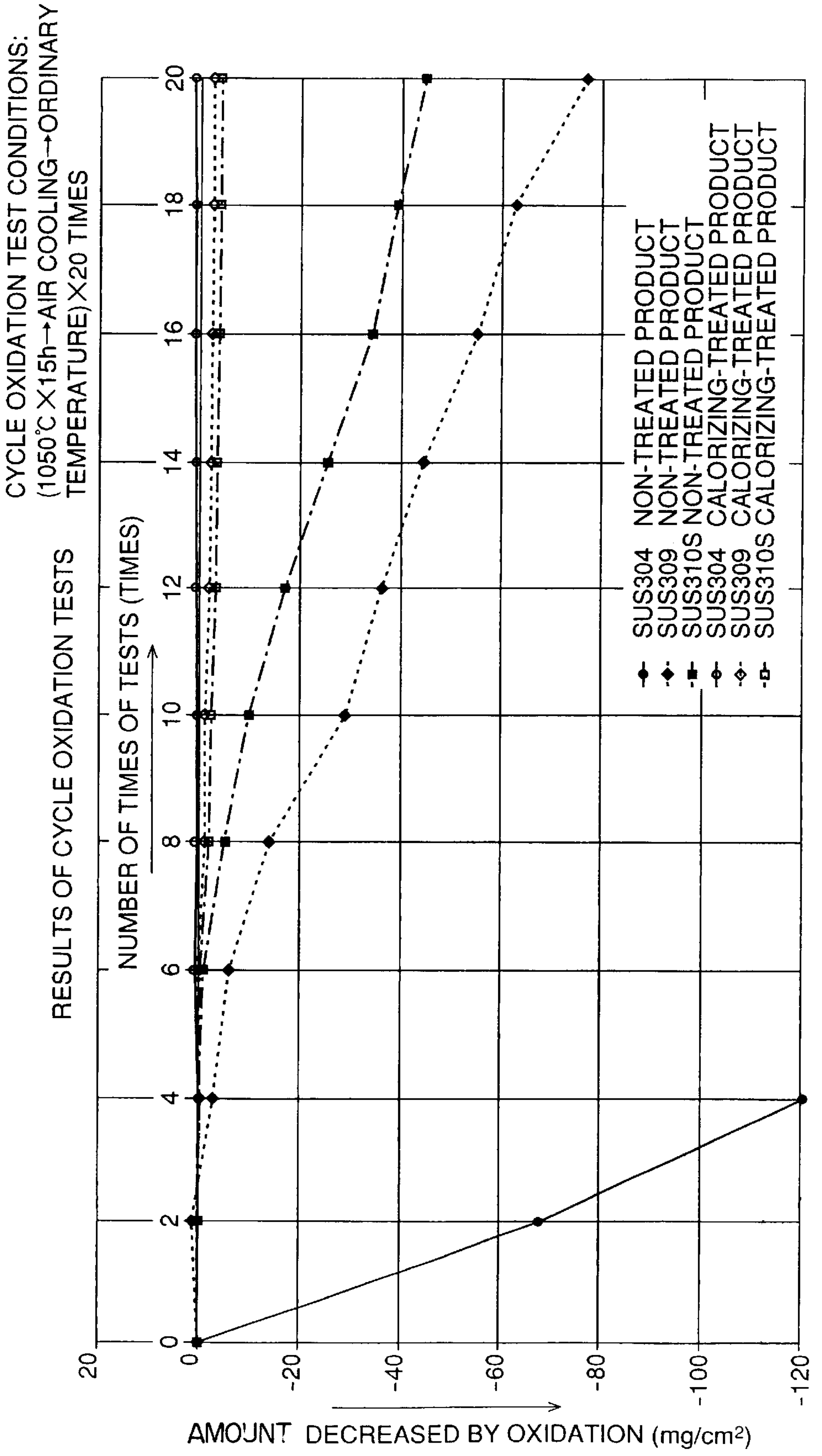
FIG. 6 is a graph showing the measurement results of the decreased amount of some of samples obtained in Example 1, after the cycle oxidation test is carried out.
Figure 7:
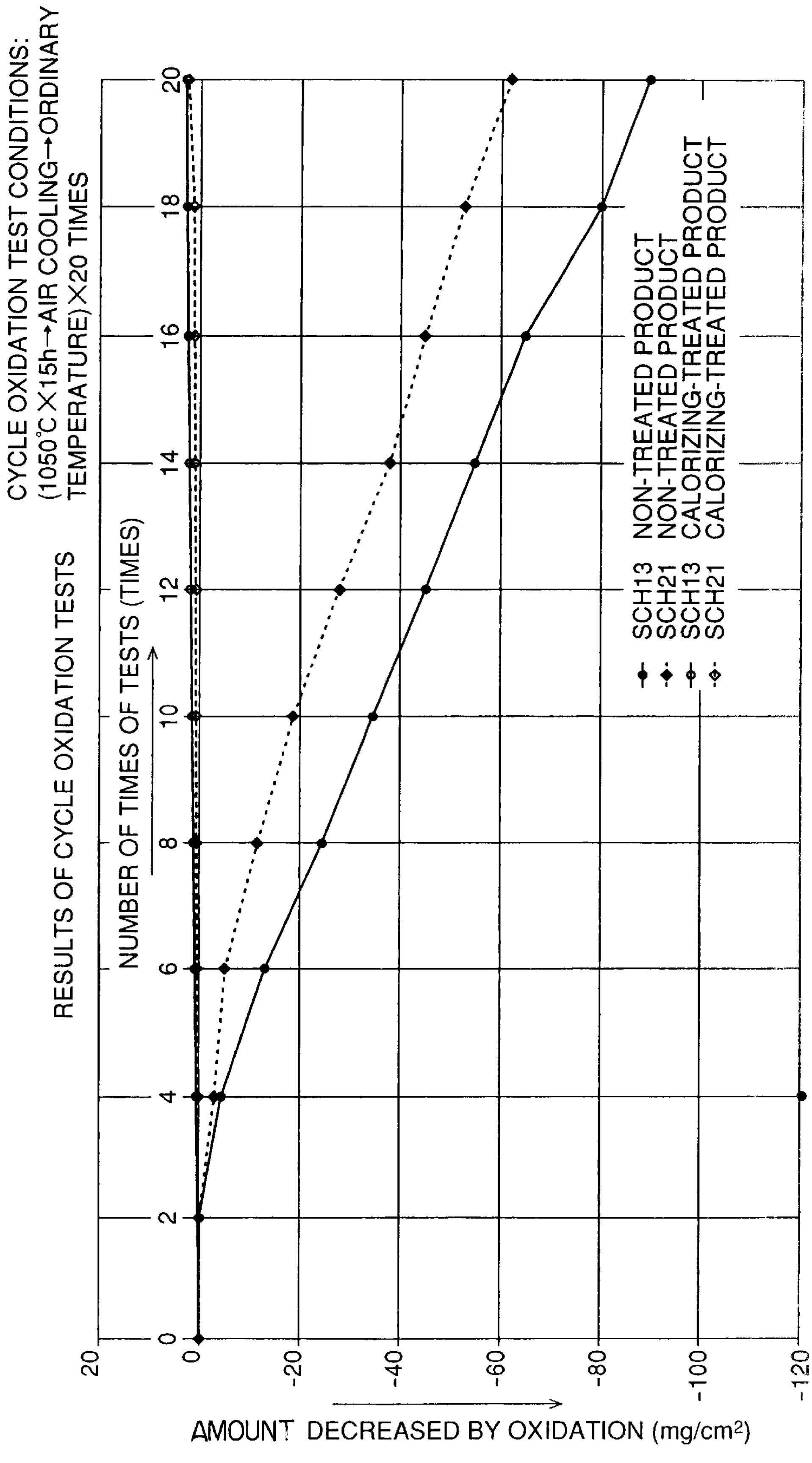
FIG. 7 is a graph showing the measured results of the decreased amount of other samples obtained in Example 1, after the cycle oxidation test is carried out.

So-called cycle oxidation test was carried out by heating each of the calorizing-treated samples obtained in Example 1 and the non-treated samples of the same materials as those of the calorizing-treated samples, in an electric furnace at a temperature of 1,050° C. for 15 hours, and then, air-cooling the sample to an ordinary temperature. Such a cycle oxidation test was repeated twenty times, and then, the amount decreased by oxidation was measured. The results thereof were shown in FIGS. 6 and 7. It was found that the amounts of the calorizing-treated samples were hardly decreased although the non-treated samples were greatly decreased, so that it was validated that the calorizing-treated samples have a superior oxidation resistance.

Example 2

Figure 8A:
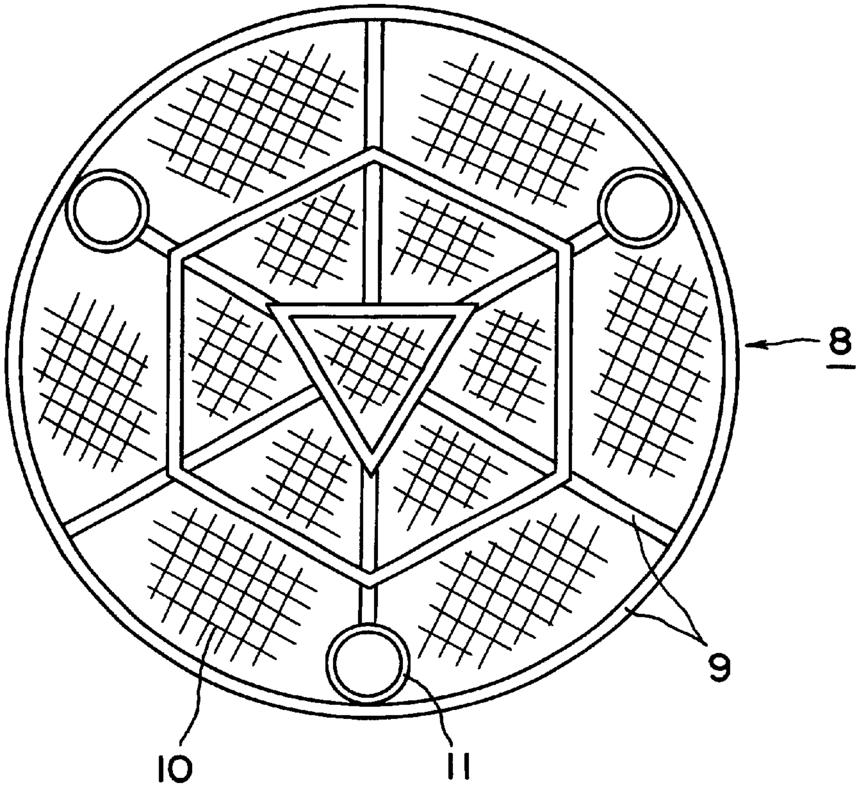
FIG. 8(*a*) is a plan view of a basket of a gas carburizing furnace used in Example 2, and FIG. 8(*b*) is a side elevation thereof.
Figure 8B:
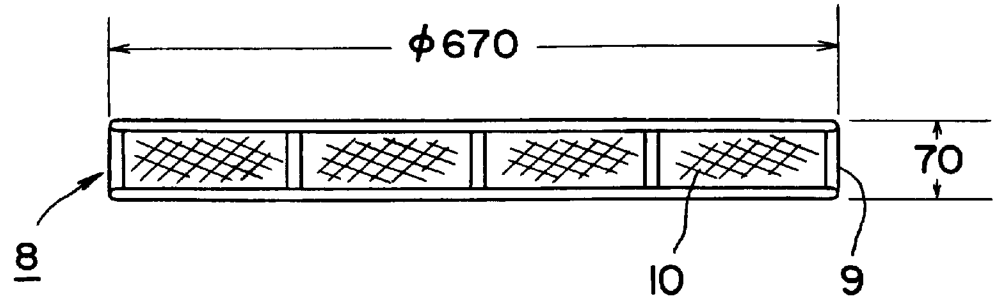

A basket shown in FIG. 8, together with a calorizing powder obtained by mixing a 55 wt % iron-aluminum alloy powder having an aluminum content of 48 wt %, a 44.5 wt % alumina powder and a 0.5 wt % ammonium chloride powder, was filled in a steel casing. The steel casing was put in a heating furnace to be heated therein at a temperature of 980° C. for 12 hours to carry out the calorizing treatment. The calorizing-treated sample thus obtained and a non-treated sample of the same material as the calorizing-treated sample were simultaneously used in a batch-type gas carburizing furnace, and the life of the calorizing-treated sample was compared with that of the non-treated sample.

After the basket, together with a product to be carburized, was gas-carburized at a temperature of 900 to 930° C., it was quenched into an oil bath from a temperature of 800 to 860° C. In the case of the non-treated product, cracks occurred at various welds and the deformation thereof was started to increase after about 100th charge. Thereafter, the non-treated product was used while being repaired. Then, the rupture and deformation of the non-treated product was bad at the time of 180th charge, so that the non-treated product reached its life. On the other hand, in the case of the calorizing-treated product, even if the 370th charge was carried out, no cracks occurred and the deformation thereof was small, so that the calorizing-treated product did not reach its life. Therefore, it was validated that the life of the calorizing-treated product was twice or more as long as than that of the non-treated product.

Furthermore, the used basket was a weld structure and had about 250 welds. Although most of the welds of the non-treated product were ruptured, none of the welds of the calorizing-treated product were ruptured. In the welds of the calorizing-treated product, even a crack did not occur. Therefore, it was validated that the calorizing treatment was very useful to prevent the deterioration of welds. In a basket 8 shown in FIG. 8, reference numbers 9, 10 and 11 denote a round bar, a wire gauze and a tube, respectively.

Furthermore, although this basket is made of an austenitic stainless steel, some portions thereof are slightly different materials. For example, the round bar is made of Japanese Industrial Standard SUS304, and the wire gauze is made of Japanese Industrial Standard SUS309S. The welding was usually carried out with the same materials as those of the aforementioned materials.

Example 3

Figure 9:
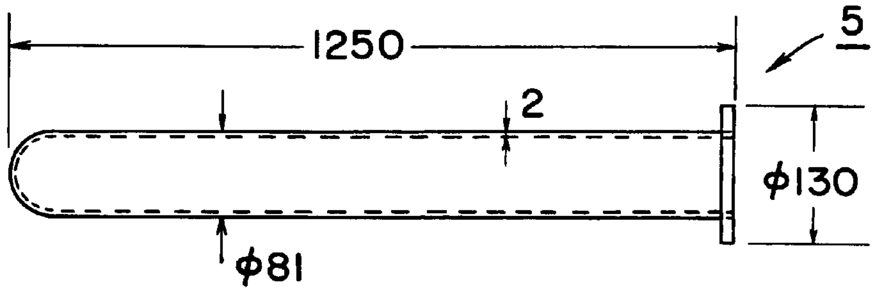
FIG. 9 is a side elevation of a heater tube of a gas carburizing furnace used in Example 3.
Figure 10:
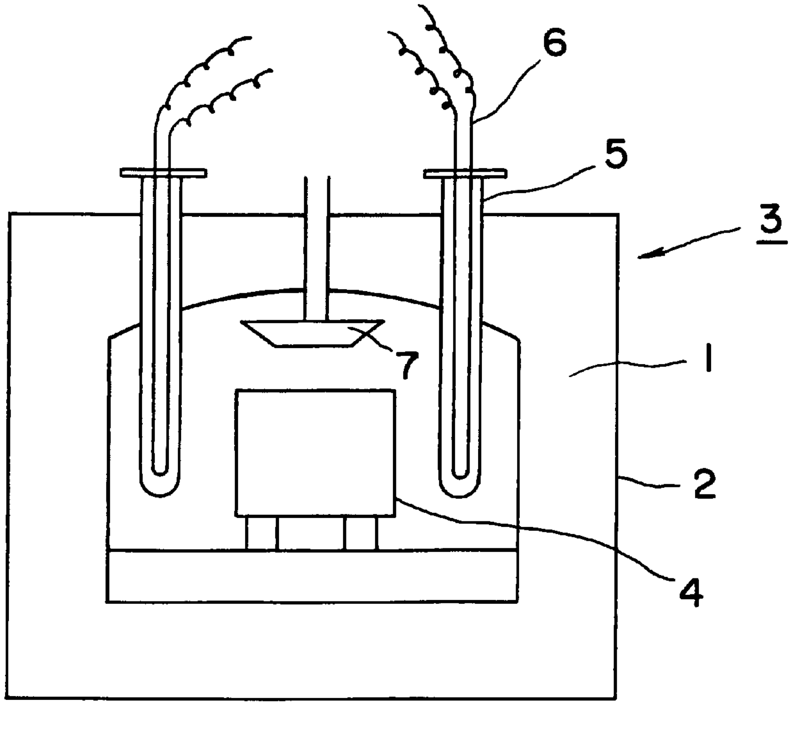
FIG. 10 is a schematic sectional view of an example of a gas carburizing furnace.

Each of heater tubes of SUS310S and SUS304, each having the size shown in FIG. 9, together with a calorizing powder obtained by mixing a 70 wt % iron-aluminum alloy powder having an aluminum content of 38 wt %, a 29.5 wt % alumina powder and a 0.5 wt % ammonium chloride powder, was filled in a steel casing. The steel casing was put in a calorizing furnace to be heated therein at a temperature of 1,000° C. for 8 hours to carry out the calorizing treatment. The calorizing-treated sample thus obtained and a non-treated sample of the same material as the calorizing-treated sample were mounted in a continuous type gas carburizing and quenching furnace shown in FIG. 10, and used therein for about 2,500 hours. Then, the samples were removed from the furnace, and the appearance and the cross section were examined. The results thereof are shown in Table 3.

Atmosphere in the tube: atmosphere

Temperature of the atmosphere in the tube: 1,000~1,050° C.

Atmosphere outside of the tube: carburization gas (RX gas)

Temperature of the atmosphere outside of the tube: 950° C.

TABLE 3

Results of Mounting Tests on Heater Tube

| | Thickness Decreased by Oxidation on Inside Face (mm) | Carburized Depth on Outside Face (mm) | Appearance |
|---|---|---|---|
| SUS310S Non-Treated Product | 0.76–0.88 | 0.85–0.92 | Perforation by Burning, Life reached by Large Deformation, and Great Amount of Oxidized Scale Deposited on Inside Face |
| SUS310S Calorizing-Treated Product | 0.08–0.09 | 0 | No Crack, No Deformation, Small Amount of Deposited Oxidized Scale |
| SUS304 Calorizing-Treated Product | 0.08–0.10 | 0 | No Crack, No Deformation, Small Amount of Deposited Oxidized Scale |

In the cases of both of the SUS310S calorizing-treated product and the SUS304 calorizing-treated product, the thickness decreased by oxidation on the side of the inside face of the tube was a ninth to a tenth of that of the SUS310S non-treated product. Although the carburized depth in the outside face of the tube was 0.85 to 0.92 mm in the case of the SUS310S non-treated product, it was 0 in the cases of all the calorizing-treated products. Thus, it was validated that the calorizing-treated products have a superior oxidation resistance and a superior carburization resistance. It is presumed that the life of the calorizing-treated products is three times or more as long as those of the non-treated products. In addition, in the cases of the non-treated products, the heater and the tube were conducted to each other through a great amount of oxidized scale deposited on the inside face of the tube to cause burning. However, in the cases of the calorizing-treated products, such a burning trouble was not caused.

In view of the foregoing, the present invention has the following advantages.

(1) It is possible to greatly extend the life, so that it is possible to reduce the costs of parts and/or jigs for a furnace and the maintenance costs.

(2) It is possible to decrease the number of renewals or replacements of parts and/or jigs and the facility troubles, so that it is possible to improve the productivity.

(3) Since the deterioration of the weld does not occur if the calorizing treatment is carried out, it is possible to change a part or jig of an expensive casting for a furnace into a part or jig of an inexpensive calorizing-treated weld structure, so that it is possible to greatly reduce the manufacturing costs.

(4) Since the SUS304 calorizing-treated product, which is cheaper than expensive heat-resistant cast steels (e.g., SCH13, SCH21) and SUS310S by several times, has better carburization resistance and oxidation resistance by far, it is possible to greatly reduce the manufacturing costs by carrying out the calorizing treatment of materials having a lowering grade than those of the current materials.

What is claimed is:

1. A part or jig of a metal for a gas carburizing furnace, which has an Al diffusion layer having an Al content of 10 to 50 wt % in a surface portion of the part or jig, the Al diffusion layer being formed by carrying out a calorizing treatment and the surface portion of said Al diffusion layer has a hardness of 350 to 1,000 mHv, and a thickness of 50 to 700 $\mu$m, wherein said calorizing treatment is carried out by: preparing a calorizing powder comprising of a mixture of 5 to 95 wt % iron-aluminum alloy powder having an aluminum content of 10 to 60 wt %. 5 to 95 wt % alumina powder and 0.1 to 1 wt % ammonium chloride powder serving as an accelerating agent; filling the calorizing powder and an object to be treated, into a semi-closed retort; and heating the retort in a heating furnace at a temperature of 600 to 1,100° C. for 5 to 20 hours while maintaining the interior of the retort in an atmosphere of an inert gas or a reducing gas.

2. The part or jig according to claim 1, wherein said inert gas is argon or nitrogen gas, and said reducing gas is hydrogen gas.

3. The part or jig according to claim 1, wherein said metal is selected from the group consisting of austenitic stainless steels and cast steels.

* * * * *